Oct. 9, 1951 R. T. CAMPBELL 2,570,763

DIAL-BACK TRUNKING SYSTEM FOR TELEPHONE EXCHANGES

Filed Dec. 6, 1947 3 Sheets-Sheet 1

Inventor:
Robert T. Campbell.
By Brown, Jackson, Boettcher & Dienner
Att'ys.

Oct. 9, 1951 R. T. CAMPBELL 2,570,763

DIAL-BACK TRUNKING SYSTEM FOR TELEPHONE EXCHANGES

Filed Dec. 6, 1947 3 Sheets-Sheet 2

Inventor:
Robert T. Campbell

By Brown, Jackson, Boettcher & Dienner
Attys.

Inventor:
Robert T. Campbell.
By Brown, Jackson, Boettcher & Dienner
Attys.

Patented Oct. 9, 1951 2,570,763

UNITED STATES PATENT OFFICE 2,570,763

DIAL-BACK TRUNKING SYSTEM FOR TELEPHONE EXCHANGES

Robert T. Campbell, Galion, Ohio, assignor to The North Electric Manufacturing Company, Galion, Ohio, a corporation of Ohio Application December 6, 1947, Serial No. 790,132

5 Claims. (Cl. 179—27)

Figure 1:
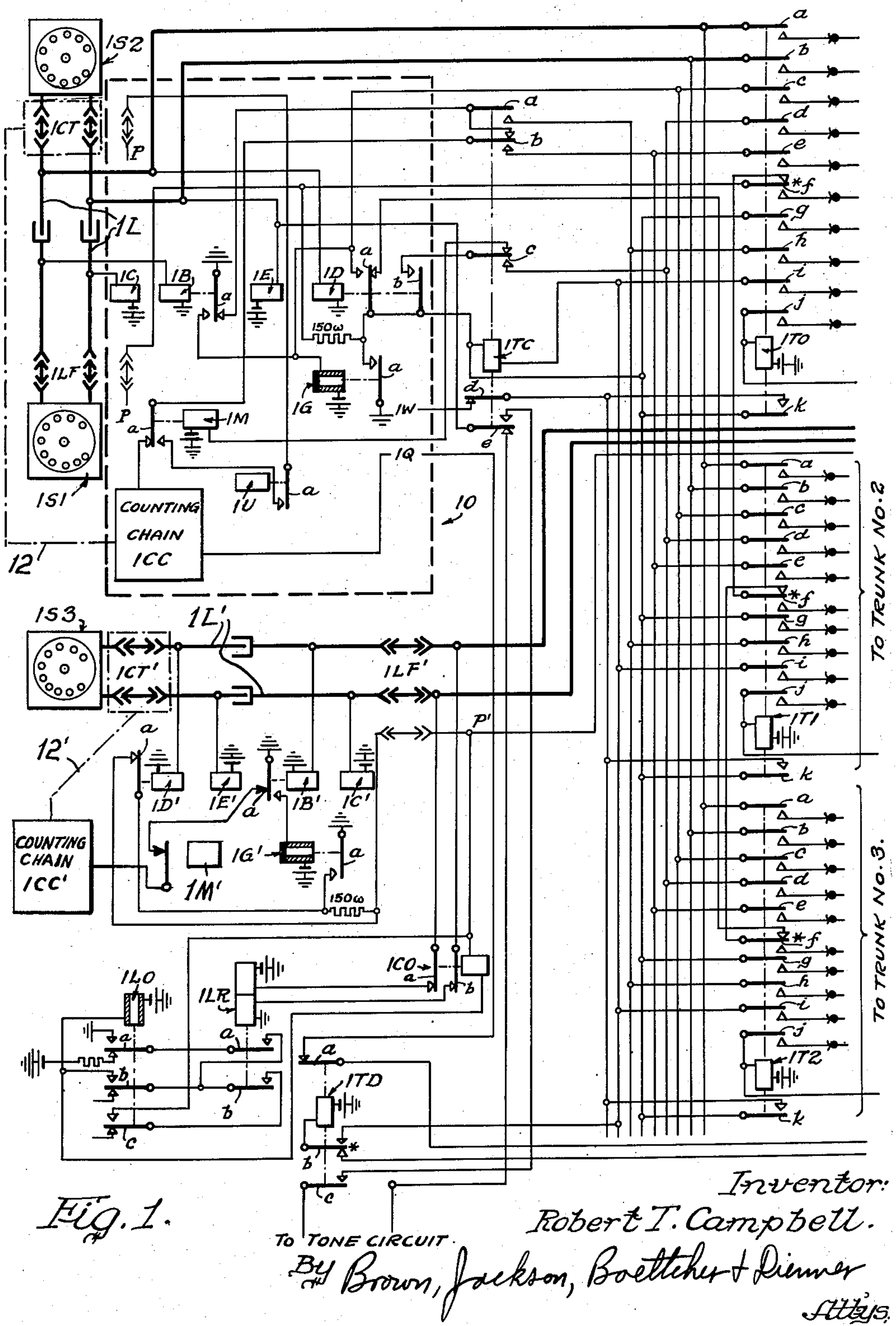

This invention relates, generally, to trunking systems for telephone exchanges, and it has particular relation to operator's trunk circuits for automatic telephone exchange systems of the all relay type, such as described in chapter VI of "Telephone Theory and Practice" by Kempster B. Miller, first edition.

A party having a dial type telephone may require the assistance of an operator, under certain circumstances, to complete a call. It is desirable to provide simple and efficient means for enabling a calling party to reach the operator. Likewise, it is desirable to provide means for permitting the operator to answer a call and to dial or otherwise obtain the called party. Further, it is desirable to provide for supervision of the call by the operator, if such is required, or to remove the operator's connection if the call does not require supervision.

When a party desires to be connected to another party in an automatic telephone exchange system, it may be necessary for the calling party to obtain the assistance of the operator for completing the call. The calling party may be unable, for some reason, to do more than call or dial the operator. In such case, in accordance with the present invention, provision is made for the call to land on an operator's trunk circuit. The operator then ascertains the number of the called party and dials the called party to complete the connection.

The present invention has more frequent application to automatic telephone exchange systems wherein there is a toll charge for the connection of one party to another. The two parties may be connected to the same telephone exchange or they may be connected into the same telephone system through one or more exchanges in tandem. In such case, it is necessary for the calling party to obtain the services of an operator so that the call can be completed under the supervision of the operator and the appropriate charge made. In the event that such a call is a flat rate call, it is desirable that provision be made so that the operator can be disconnected from the circuit while the parties remain connected. If the call requires metering, then it is desirable that the operator supervise the call to determine the duration thereof so that the appropriate charge can be made.

Among the objects of this invention are: to permit a calling party to select an idle operator's trunk; to prepare for selection of the next idle trunk circuit in the event that one or more trunk circuits are busy; to provide for signaling the operator over the trunk circuit that a call has landed on it; to provide for dialing or otherwise signaling the called party over the trunk circuit; to signal the operator over the trunk circuit that the called party has answered; to permit the operator to supervise the call; and to provide for the operator to release the trunk after the call has been completed, while the parties remain connected.

Other objects of this invention will, in part, be obvious and in part appear hereinafter.

This invention is disclosed in the embodiments thereof shown in the accompanying drawings, and it comprises the features of construction, combination of elements, circuit connections and arrangement of parts which will be exemplified in the construction hereinafter set forth and the scope of the application of which will be indicated in the appended claims.

Figures 2, 4:
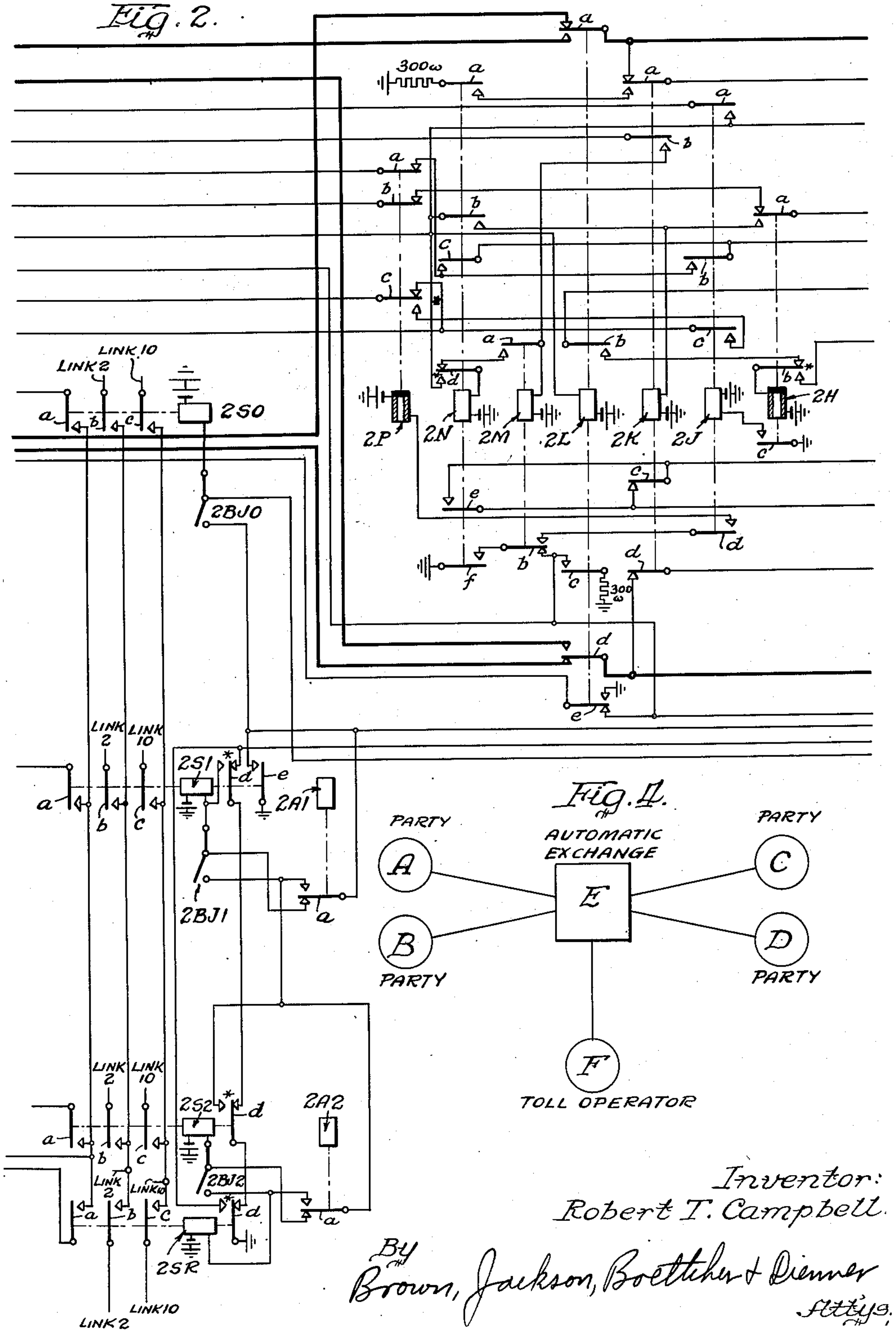
Figure 3:
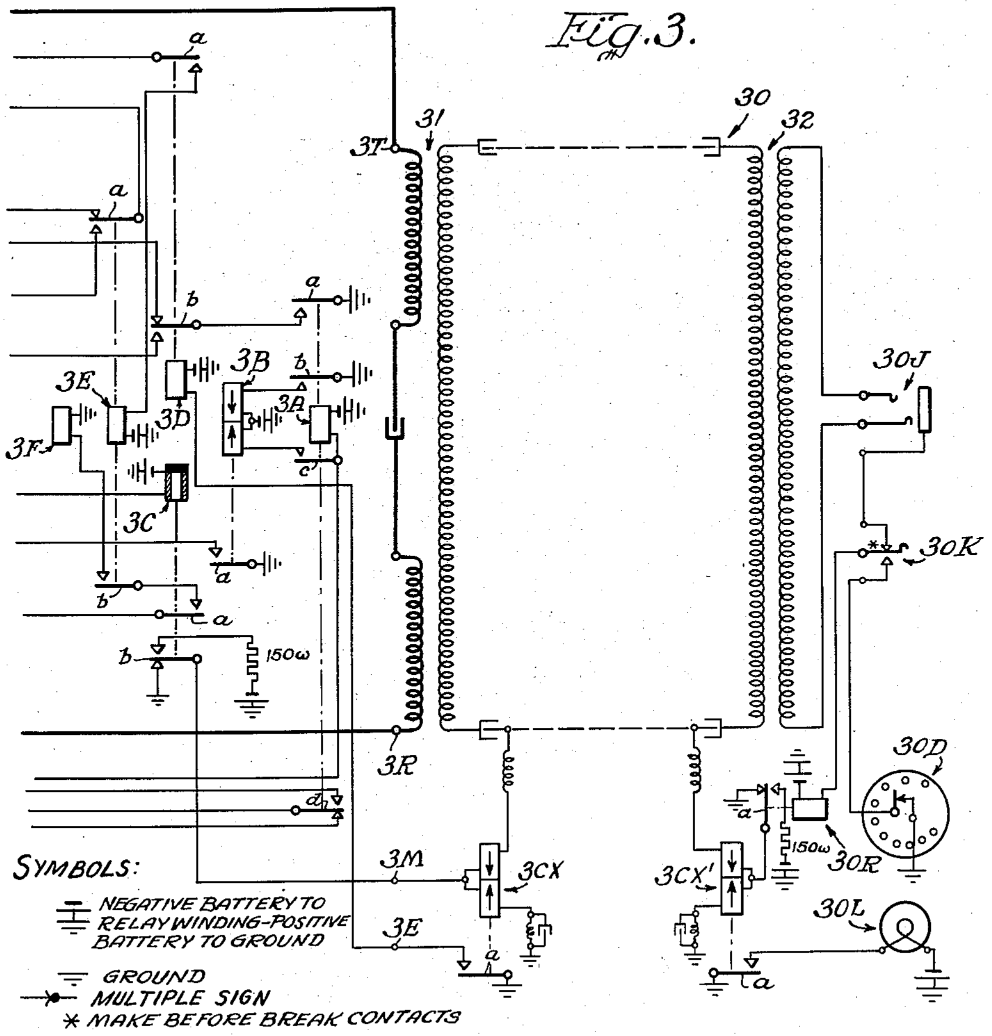
Figure 5:
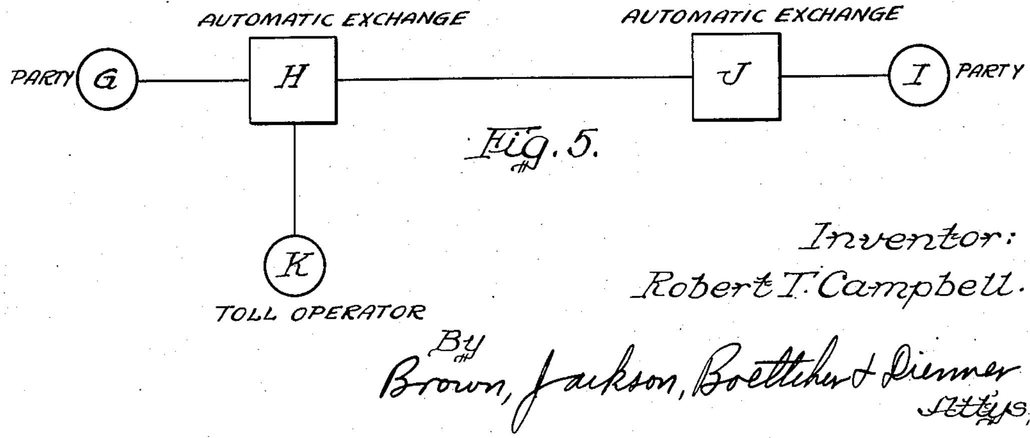

For a more complete understanding of the nature and scope of this invention, reference may be had to the following detailed description, taken together with the accompanying drawings, in which:

Figures 1, 2 and 3 taken together, in side-by-side relationship, illustrate, diagrammatically, a preferred embodiment of this invention; and Figures 4 and 5 illustrate, schematically, different applications of the present invention.

Referring first to Figure 4 of the drawings, it will be observed that parties A, B, C and D are serviced by an automatic telephone exchange E which may be of the all relay type as described in "Telephone Theory and Practice" by Miller referred to hereinbefore. The arrangement may be such that party A can call party B and party C can call party D merely by dialing the corresponding number. However, when party A wishes to communicate with either party C or D or party B wishes to communicate with party C or D, an additional charge is required. Accordingly, party A or party B cannot dial party C or party D directly. Instead it is necessary to employ the services of a toll operator F. The toll operator F may have several trunk circuits extending into the automatic exchange E for use in completing calls, such as those just described between parties A or B and parties C or D. The particular circuit connections involved in these trunks will be described in detail hereinafter.

In Figure 5 of the drawings, party G is illustrated as being associated with an automatic telephone exchange H. Likewise party I is illustrated as being associated with an automatic telephone exchange J. The exchanges H and J are indicated as being connected in tandem. When the party G desires to communicate with party I, it is necessary that the services of toll operator K be employed. The toll operator is illustrated as being associated with exchange H. However, it will be understood that toll operator K can be associated with exchange J.

The schematic circuit arrangements shown in Figures 4 and 5 are merely illustrative of various applications of the present invention. It will be understood that more than two automatic exchanges can be connected in tandem and that the called party may be reached through a manual board rather than through an automatic exchange.

In Figures 1, 2 and 3 of the drawings, there are illustrated only the circuit connections for one of the operator's trunk circuits together with certain of the relays that are employed in the automatic telephone exchange system. Since the details of the circuits for the all relay type of automatic telephone equipment with which the present invention may be used, are well known to those skilled in the art, they are omitted from this disclosure in the interest of simplification and clarity. While several operator's trunk circuits can be employed, only three are illustrated, one in full, while the other two are illustrated in part. The reference characters applied to the various apparatus units in Figures 1, 2 and 3 bear prefixes which correspond to the figure number. Thus, all of the apparatus units to which reference characters are applied in Figure 1 begin with number 1. This also applies to Figures 2 and 3.

*Description of apparatus*

For illustrative purposes the telephone set of the calling party is illustrated in Figure 1 at 1S1. The called party telephone set is indicated at 1S2. The reference character 1LF diagrammatically indicates a line finder of the automatic exchange, and particularly the tens and units relay contacts and the intervening multiple of this line finder. The reference character 1CT diagrammatically indicates an associated connector in this automatic exchange, and particularly the tens and units relay contacts and the intervening multiple of this connector. The line finder 1LF and the connector 1CT together constitute an automatic link 1L in this automatic exchange. It will be understood that each party has access to a number of line finders and connector links in an automatic exchange of the all relay type.

So much of the connector that is required for an understanding of the present invention is indicated within the broken line in Figure 1 and may be referred to by the reference character 10. This portion of the connector includes pilot circuits *p*, one for each line. It also includes relays 1B, 1C and 1G which are associated with party set 1S1 and relays 1D and 1E which are associated with party set 1S2 when the associated line finder and connector links are selected by the calling party. In addition control relays 1M and 1U are provided. Also, there is included a counting chain 1CC which comprises a series of relays that are operated in accordance with the dial impulses received from the calling party in the first instance and later in accordance with the dialing of the operator to complete a call after it has landed in the operator's trunk circuit. For brevity and simplification the counting chain is not drawn out in detail, but for a more detailed explanation reference may be made to chapter VI of "Telephone Theory and Practice" by Kempster B. Miller under the term "Dial-Impulse Register." See also sections 310–311*b* of "Automatic Telephone Practice" by Harry Hershey. This counting chain 1CC is arranged to control the units and tens relays in connector end 1CT of the automatic link 1L, this controlling relation being schematically represented by the dash-and-dot line 12 in Figure 1. In addition there is included a conductor 1Q which is connected to the counting chain 1CC and by which it is connected to ground to perform certain control functions. There is also conductor 1W which is arranged to have a control voltage applied thereto for performing certain control functions in the connector 10.

In accordance with the present invention, the operator may originate a call over a trunk circuit. In such case, the called party's set is indicated at 1S3. The line finder and connector links which may be employed for this purpose are illustrated at 1L', these automatic links comprising a line finder end 1LF' and a connector end 1CT', this connector end 1CT' being controlled by a counting chain 1CC' in substantially the same manner as described above of the counting chain 1CC. Relays 1B', 1C' and 1G' correspond to relays 1B, 1C and 1G, previously referred to. In addition relays 1D' and 1E' correspond to relays 1D and 1E. There are also provided a cutoff relay 1CO, a line relay 1LR and a lock out relay 1LO.

One of the operator's trunk circuits includes a cutoff relay 1TC, a trunk selection relay 1TO and a trunk alloter relay 2SO (Figure 2). In addition there is provided a busy jack 2BJO in the form of a transfer switch which may be operated from the position shown in Figure 2 to the alternate position so as to remove the associated operator's trunk circuit from the system to prevent a call landing on it, thus causing the call to land on the next idle operator's trunk circuit. It should be noted that there is one relay 2SO to 2S2 per trunk, but that there is a group of relays 1TO to 1T2 and 1TD per connector. Relay 2SO, for example, prepares the circuits of the several relays 1TO, the particular relay 1TO to pull being determined by the particular connector through which the call is proceeding.

The operator's trunk circuit also includes trunk relays 3A, 3B, 3C, 3D and 3E and impedance coil 3F in Figure 3 and trunk relays 2H, 2J, 2K, 2L, 2M, 2N and 2P in Figure 2. The operator's trunk circuit thus far described may terminate in terminals 3T, 3R, 3M and 3E to which a conventional composite signaling, talking and dialing circuit, illustrated generally at 30, may be connected. The circuit 30 may have various forms and per se forms no part of the present invention. It is illustrated merely to disclose the invention more clearly and is in a simplified form; many features having been omitted therefrom which make for better operation of the circuit but which are not required for an understanding of the present invention.

The circuit 30 includes repeating coils shown generally at 31 and 32. Differential relays 3CX and 3CX' may be associated with one leg of the circuit 30 to permit dialing by the operator on the one hand and signaling of the operator on the other. There is also provided an operator's jack 3OJ, which is arranged to receive an operator's plug for connecting the operator's head set into the circuit or for permitting the operator to complete the call directly to another exchange without going back over the trunk circuit. When the operator's plug is inserted in the operator's jack 3OJ, ground is placed on the sleeve connection for energizing relay 3OR. An operator's key 3OK is associated with the jack 3OJ to permit the operator to connect an operator's dial 3OD or equivalent apparatus into the circuit for controlling the functioning of relay 3OR for the purpose of dialing or otherwise signaling the called party. When differential relay 3CX' operates, it completes a circuit and energizes operator's light 3OL. This light is energized to indicate to the operator that a call has landed on the associated operator's trunk circuit. Subsequently, it is lit to indicate that a called party has answered.

Only a portion of the connections for two additional operator's trunk circuits are illustrated. For this purpose trunk selection relays 1T1 and 1T2 are illustrated together with trunk allotter relays 2S1 and 2S2 and associated trunk relays 2A1 and 2A2, corresponding to relays 3A. Also are illustrated busy jacks 2BJ1 and 2BJ2 which are associated with relays 2S1 and 2S2.

Reset relay 2SR is provided to operate when all trunks are busy, preparing for the operation of relay 1TD associated with any link attempting a call under these conditions.

If all of the available operator's trunk circuits are busy, when a party attempts to call the operator, then an all-trunk busy relay 1TD is energized to connect the calling party's line to a tone circuit to provide a busy signal.

*Circuit tracing*

In tracing the circuits for describing the functioning of the system disclosed herein, reference will be made only to the relay contacts, relay windings, battery, ground, and various resistors by their ohmic resistance. The battery symbol indicates that the negative terminal of the battery is connected to the associated relay winding and that the positive battery terminal is connected to ground. The ground symbol connected to relay windings and contacts corresponds to the positive battery terminal. Thus, it is unnecessary to complicate the diagram by showing the common connections between the relay windings and the negative battery terminal and between the positive battery terminal and the contacts and relay windings. For illustrative purposes, the circuit for energizing trunk allotter relay 2SO will be traced—it being assumed that all of the operator's trunks are idle, that trunk relay 3A is deenergized and that trunk allotter relays 2S1 and 2S2 and reset relay 2SR also are deenergized.

2SO pulls: Battery, 2SO, 2BJO, *b*3A*d*, *b*2S1*d*, *b*2S2*d*, *b*2SR*d*, ground.

This circuit may be traced in words as follows: From negative battery through the winding of trunk allotter relay 2SO, contacts of busy jack 2BJO, the back contacts of the fourth set of contacts of trunk relay 3A, the back contacts of the fourth set of contacts of trunk allotter relay 2S1, the back contacts of the fourth set of contacts of trunk allotter relay 2S2, the back contacts of the fourth set of contacts of reset relay 2SR to positive battery.

It will be observed that small letter *b* refers to the back or closed contacts when the relay is deenergized. The letter *f* will be used to indicate the front contacts which are closed when the relay is energized. In reference to contacts the letters *b* and *f* will be used as prefixes to indicate whether the back or front contacts are referred to. The various contacts of a relay are referred to by the letters *a*, *b*, *c*, etc., beginning from left to right or from top to bottom.

*A calling party lands a call in the operator's trunk circuit*

It will be assumed that a party at set 1S1 desires to call the party at set 1S2, and that the services of an operator are required to complete it. Further, it will be assumed that all of the operator's trunk circuits are available. In such case, trunk allotter relay 2SO is energized over the circuit previously traced. Since, under these conditions, contacts *f*3A*d* are open, the other trunk allotter relays 2S1 and 2S2 are deenergized.

The subscriber at set 1S1 lifts the handset. This results in the extension of the calling line through contacts of line-finder switching tens and units relays indicated at 1LF, and also results in the selection of an available connector, designated 10, as described in "Telephone Theory and Practice." Connector relays 1B and 1C energize in series over the calling party's line. This circuit may be traced as follows: Battery, 1C, line, set 1S1, line 1B, ground. The operation of relay 1B completes an obvious energizing circuit for extra-slow-to-deenergize relay 1G.

The party then signals the operator by dialing "0" or some other prearranged digit. The calling party performs no other operation except to tell the operator the number of the called party. After the conversation with the called party is completed, the calling party restores the handset to the normal position.

When the calling party signals the operator, as by dialing "0," the counting chain 1CC is stepped until finally ground is connected to conductor 1Q. A circuit is completed for energizing trunk selection relay 1TO.

1TO pulls: battery, 1TO, *f*2SO*a*, *b*1TD*a*, 1Q, ground.

Link selection relay holds: battery, 1TO, *f*1TO*j*, *b*2P*c*, *f*1TO*i*, 1TC, *f*1G*a*, ground.

One result of the pulling of trunk selection relay 1TO is to complete an energizing circuit for trunk relay 2L which, at contacts *a* and *d* transfers the talking circuit of the operator's trunk circuit to the trunk line to permit the operator to talk to the calling party.

2L pulls: battery, 2L, *f*1TO*g*, *f*1G*a*, ground.

The energization of trunk relay 2L completes a circuit for pulling lock out relay 1LO and cut-off relay 1CO in series to prevent the trunk associated therewith from seizing another link in the automatic exchange.

1LO and 1CO pull: battery, 1LO, 1CO, *p'*, *f*2L*e*, ground.

A further result of the energization of trunk relay 2L is to complete a circuit for energizing trunk relay 3A.

3A pulls: battery, 3A, *f*2L*c*, 300, ground.

The energization of trunk relay 3A, at contacts *b* and *c*, completes circuits for energizing the differential windings of trunk relay 3B. It will be observed that one winding of relay 3B is connected from battery through to ground over f3Ab while the other winding is energized over f3Ac and f2Lc to ground over a 300 ohm resistor. Because of the presence of the 300 ohm resistor in this circuit, the effects of the coils of relay 3B are not neutralized and trunk relay 3B pulls.

When trunk relay 3A has pulled, the previously traced energizing circuit for trunk allotter relay 2SO is opened and it drops. The circuit is then completed for energizing the next trunk allotter relay 2S1:

2S1 pulls: battery, 2S1, 2BJ1, *b*2A1*a*, *f*3A*d*, *b*2S1*d*, *b*2S2*d*, *b*2SR*d*, ground.

A holding circuit for trunk allotter relay 2S1 is completed at make before break contacts *f*2S1*d*.

The next party initiating a call for the operator will use the next or second operator's trunk circuit since the first trunk circuit is busy. Trunk allotter relay 2S1 will be deenergized and trunk allotter relay 2S2 will be energized to make the next or third operator's trunk circuit available for the next calling party. When trunk allotter relay 2S2 pulls, reset relay 2SR also pulls.

2SR pulls: battery, 2SR, *f*2A2*a*, *f*2S2*d*, *b*2SR*d*, ground.

Reset relay 2SR holds over *f*2SR*d*.

Now if a fourth party attempts to call the operator when the three available operator's trunk circuits are busy, the application of ground to conductor 1Q completes a circuit for energizing all-trunks-busy-relay 1TD.

1TD pulls: battery, 1TD, *b*1TD*b*, *f*2SR*a*, *b*1TD*a*, 1Q, ground.

Relay 1TD holds over *f*1TD*b*. At contacts *b*1TD*a* the circuit from conductor 1Q of any additional calling party is opened and this prevents the selection of an operator's trunk circuit if one should become idle and applies a busy tone to the calling line. It is necessary for the party to hang up and then pick up the handset again to call the operator.

Returning now to the description of the selection of the operator's trunk circuit by the party at 1S1, the energization of trunk selection relay 1TO completes a circuit at contacts *f*1TO*k* for placing ground on conductor 1W, to perform certain functions in the connector 10, a description of which is not necessary for an understanding of the present invention.

When trunk allotter relay 2SO drops, the connection to ground over contacts *f*2SO*a* for the winding of relay 1TO is opened and this winding is then placed in series with the winding of cut-off relay 1TC which relay immediately pulls. The pulling of cut-off relay 1TC transfers the control of the counting chain 1CC at *f*1TC*b* from the calling party to the operator's trunk circuit. As will appear hereinafter the operator operates the counting chain 1CC to select and signal or call the called party at 1S2.

As a result of the pulling of the trunk relay 3B a circuit is completed for energizing extra-slow-to-deenergize relay 3C.

3C pulls: battery, 3C, *b*2K*c*, *f*3B*a*, ground.

At *f*3C*b* a circuit is completed for placing battery on terminal 3M through a 150 ohm resistor. It will be noted that the common connection to the differential coils of relay 3CX is connected to terminal 3M. The arrangement of the windings of differential relays 3CX and 3CX' and their connections in the composite circuit 30 are such that, while relay 3CX does not pull, relay 3CX' pulls to complete a circuit at *f*3CX'*a* for energizing operator's lamp 3OL to signal the operator that a call has landed in the associated operator's trunk circuit. This signaling is commonly termed "Duplex" signaling, and is well known in the telephone art.

*The operator answers the call*

The operator now inserts a plug in jack 3OJ. This grounds the sleeve connection of the jack 3OJ and thus effects the energization of relay 3OR over an obvious circuit. As a result of the pulling of relay 3OR, a circuit is completed at *f*3OR*a* for pulling relay 3CX. At contacts *f*3CX*a* ground is placed on terminal 3E. As a result of ground being placed on terminal 3E, trunk relay 3D pulls. Thereafter relays 3E and 1D pull in series.

3E and 1D pull: battery, 3E, *f*3D*a*, *b*2K*a*, *f*2L*a*, *f*1TO*a*, 1D, ground.

Extra-slow-to-release trunk relay 2H pulls as a result of the pulling of trunk relay 3E.

2H pulls: battery, 2H, *b*2H*b*, *f*2L*b*, *f*3E*a*, *f*1TO*g*, *f*1G*a*, ground.

2H holds: ground, 2H, *f*2H*b*, *f*3D*b*, *f*3A*a*, *f*1TO*g*, *f*1G*a*, ground.

The pulling of trunk relay 3E also completes a circuit for energizing connector relay 1E in series with impedance coil 3F.

1E pulls: battery, 1E, *f*1TO*b*, *f*2L*d*, *b*2K*d*, *f*3C*a*, *f*3E*b*, 3F, ground.

At contacts *b*3E*a*, a short circuit around the 150 ohm resistor in the connector 10 is removed. This effects a control function where the call originates at a pay station or the like. At contacts *f*2H*c*, an obvious energizing circuit is completed for a trunk relay 2J. At contact *f*2J*b*, a circuit is completed for dial back pulsing over the operator's trunk circuit to the connector 10 for driving the counting chain 1CC in accordance with the number of the called party.

If the operator so desires, the call from the party at 1S1 can be extended through a manual exchange by connecting the other plug of the operator's cord which is plugged into the jack 3OJ into the appropriate jack as will be readily understood.

*The operator dials the called party*

In accordance with the present invention, the circuits are now set up so that the operator can dial the number of the called party back over the operator's trunk circuit. If the system is as illustrated in Figure 4, the dialing of the called party's number results in the operation of counting chain 1CC (see "Dial-Impulse Register," chapter VI, "Telephone Theory and Practice"), and consequently the operation of connector switching tens and units relay contacts indicated at 1CT to make connection to set 1ST and ring the bells at said set. If the system is arranged as illustrated in Figure 5, the call may go through one or more automatic or manual exchanges in tandem to reach the called party. For purposes of illustration, it will be assumed that the system is arranged as illustrated in Figure 4 and that the operator dials the number of the called party back over the trunk circuit to operate the counting chain 1CC for calling the party at 1S2 and placing the same in communication with the party at 1S1.

In order to dial the number of the called party, the operator shifts the key 3OK to the alternate position to place the dial 3OD in the circuit of relay 3OR. The operator now dials the digits of the number of the called party. The relay 3OR is alternately deenergized and energized in accordance with the digits dialed. Relay 3CX operates in synchronism with relay 3OR to remove and replace ground on terminal 3E, thereby operating trunk relay 3D in synchronism with the dialed impulses.

The first dropping of trunk relay 3D opens the previously traced circuit for energizing relays 3E and 1D, and they drop. The dropping of relay 3E completes a circuit for energizing trunk relay 2K.

2K pulls: battery, 2K, *f*2H*a*, *b*3E*a*, *f*1TO*g*, *f*1G*a*, ground.

The dropping of trunk relay 3E also opens the circuit for relay 1E which was energized in series with impedance coil 3F. The dropping of relays 1D and 1E is in preparation for signaling the operator that the called party at 1S2 has answered by picking up the handset.

Trunk relay 2K in pulling opens the circuit at *b*2K*c* for trunk relay 3C. This relay drops and removes battery from terminal 3M and grounds the same. As a result differential relay 3CX' drops and the operator's light 3OL is extinguished. As will appear hereinafter, when the called party answers, the operator's lamp 3OL is again lit to signal the operator that this has occurred.

Trunk relay 3D drops and pulls in accordance with the impulses originating from the operation of the dial 3OD. The closing and opening of contacts *b*3D*b* steps the counting chain 1CC to cause the connector link 1CT to select the line of the called party at 1S2 and to ring the same.

*The called party answers*

When the called party at 1S2 picks up the handset, connector relays 1D and 1E are energized in series over the line of the called party. The pulling of relay 1D completes a circuit for energizing trunk relay 2M.

2M pulls: battery, 2M, *f*2K*b*, *f*1TO*d*, *f*1TC*c*, *f*1D*b*, *f*1G*a*, ground.

The pulling of relay 2M completes a circuit for pulling trunk relay 2N.

2N pulls: battery, 2N, *b*2N*d*, *f*2M*a*, *f*2K*b*, *f*1TO*d*, *f*1TC*c*, *f*1D*b*, *f*1G*a*, ground.

At contacts *f*2N*d*, relay 2N holds.

The pulling of trunk relay 2N completes a circuit for again energizing relay 3C.

3C pulls: battery, 3C, *f*2Ne, *f*3B*a*, ground.

Battery is again applied over contacts *f*3C*b* to terminal 3M and differential relay 3CX' pulls. At contacts 3CX'*a*, the circuit for energizing operator's lamp 3OL is again completed. The lamp 3OL lights to signal the operator that the called party has answered.

The energization of relay 2N completes a circuit for energizing extra-slow-to-release relay 2P.

2P pulls: battery, 2P, *f*2J*d*, *f*2M*b*, *f*2N*f*, ground.

At contacts *f*2P*c*, the holding circuit for relays 1TC and 1TO is transferred to contacts *f*2J*c* which are closed.

*The operator's trunk circuit is released*

The called party 1S2 now is in communication with the calling party 1S1. If the call is at a flat rate, there is no necessity for the operator to supervise the call and accordingly, the operator can effect the disconnection of the operator's trunk circuit which has been used for completing the call so as to make it available to handle another incoming call. Even though the trunk circuit is released, the parties at 1S1 and 1S2 remain in communication. This setup exists as long as both parties remain on the line.

It will be assumed that the call is at a flat rate and that the parties can talk without any time limitation. In order to remove the operator's trunk circuit from the system, the operator restores the operator's key 3OK to the normal position and removes the plug from the jack 3OJ. The operator's relay 3OR drops and as a result, relay 3CX drops and ground is removed from terminal 3E and trunk relay 3D drops. The dropping of relay 3D causes relay 3E to drop and after a time, delay relay 2H drops.

The dropping of relay 2H drops relay 2J which opens the holding circuit for relays 1TC and 1TO and they drop. The dropping of relay 2J also causes relay 2P to drop after a time interval.

The dropping of relay 1TO causes trunk relays 2M, 2K, 2L and 2N to drop. The dropping of trunk relay 2L causes relays 3A, and in turn 3B and 3C to drop. The dropping of relay 3C removes battery from terminal 3M, dropping relay 3CX', thereby extinguishing lamp 3OL. The dropping of trunk relay 2L causes relay 3A to drop and it, in turn, causes relay 3B to drop. The dropping of relay 2L also causes relays 1LO and 1CO to drop. The dropping of relay 3A completes the previously traced circuit for pulling trunk selection relay 2SO, it being assumed that in the meantime trunk selection relays 2S1 and 2S2 have been pulled and dropped. As a result of the cycle of operations initiated by the return of the operator's key 3OK to normal and the pulling of the plug from the jack 3OJ, only relays 1B, 1C and 1G individual to the party at 1S1 and relays 1D and 1E individual to the party at 1S2 remain pulled. When these parties hang up, these relays drop and the system, insofar as they are concerned, is restored to the initial condition ready for the placing of subsequent calls.

*The operator supervises the call*

If the call between the parties at 1S1 and 1S2 is not at a flat rate and must be supervised to determine the charge, the operator must maintain the operator's trunk circuit connected into the system. The operator determines when the parties are finished when the operator's light 3OL goes out. Assuming that the operator supervises the call, the next operation that takes place is the hanging up by either calling or called party. If the calling party hangs up first, relays 1B and 1C associated with the party at 1S1 release, but relay 1G remains energized.

Relay 1G holds: battery, 1G, *f*1TO*c*, *f*2J*a*, *f*1TO*g*, *f*1G*a*.

Relay 1B in dropping places ground on the lower winding of relay 3B and thereby causes it to drop which, in turn, causes relay 3C to drop. Relay 3C in dropping removes battery from terminal 3M and relay 3CX' drops, thereby extinguishing the operator's lamp 3OL. The operator is then advised that one of the parties has hung up and terminates the supervision of the call.

If the called party hangs up first, relays 1D and 1E associated with the party at 1S2 release, but relay 1G remains energized.

Relay 1D in dropping releases relay 2M. Relay 2M, in dropping, places direct ground on the lower winding of relay 3B which signals the operator as described above. The operator is then advised that one of the parties has hung up and terminates the supervision of the call.

When the operator notes that lamp 3OL is extinguished, the plug is removed from jack 3OJ. Relay 3OR drops and effects the dropping of relay 3CX. Ground is removed from terminal 3E and relay 3D drops. The trunk is then released as described hereinbefore.

*The operator originates a call*

The operator can originate a call to the party at 1S3 over the trunk circuit by inserting the plug in the jack 3OJ. Relay 3OR is pulled which results in the pulling of relay 3CX to place ground on terminal 3E, operating relay 3D.

1LR and 3E pull: battery, 3E, *f*3D*a*, *b*2K*a*, *b*2L*a*, *b*1CO*b*, 1LR, ground.

The operation of line relay 1LR selects a link 1LF' and a corresponding connector 1CT'. Ground is placed on the pilot wire *p'* and relay 3A pulls. The operator moves key 3OK to the alternate position and operates the dial 3OD to dial the number of the party at 1S3. The operation of the dial 3OD causes trunk relay 3D to operate to pulse connector relay 1B and in turn step the counting chain of the selected link (see "Telephone Theory and Practice," chapter VI): battery, 3E, *f*3D*a*, B2K*a*, *b*2L*a*, line-finder switching tens and units relay contacts 1LF', 1B, ground. Ground, *b*1B*a*, *b*1M'*a*, counting chain. The operation of the counting chain energizes the appropriate connector multiple switching tens and units relays to route the call over contacts of these relays designated 1CT' to set 1S3 and also control circuits to ring the bells of this set (see "Telephone Theory and Practice"). When the party at 1S3 answers, relays 1D' and 1E' are energized. A 150 ohm resistor is connected into the pilot wire circuit *p* to effect the operation of differential relay 3B. As a result, relay 3C is energized to place battery on terminal 3M. Relay 3CX' operates to effect the energization of lamp 3OL which, when lit, indicates to the operator that the party at 1S3 has answered. When the called party at 1S3 hangs up, relays 1D' and 1E' drop. This places direct ground on the pilot wire *p* and relays 3B and 3C drop. Ground is again placed on terminal 3M, relay 3CX' drops and operator's lamp 3OL is extinguished, thereby advising the operator that the called party has hung up.

The operator then removes the plug from the jack 3OJ and relays 3D and 3E drop. As a result, relays 1B' and 1C' drop and, in turn, relay 1G' drops and releases the link. Since ground has been removed from the pilot wire *p*, relay 3A drops and the circuit is restored to normal.

Since certain further changes can be made in the foregoing construction and circuits and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In an automatic telephone exchange system of the all-relay type wherein a calling party may require the services of an operator to complete calls to certain called parties, in combination, an automatic exchange of the all-relay type, a calling party's line entering said exchange, a called party's line entering said exchange, a line finder and a connector in said exchange together constituting an automatic link adapted to be engaged by the calling party for normally establishing connection between said lines, an operator's trunk circuit arranged to be connected to said automatic link, said operator's trunk circuit including a two-wire composite signalling, talking and dialling circuit, a signal lamp at the operator's position, means responsive to a dial signal from said calling party for selecting said trunk circuit and connecting the same into said system, means responsive to the selection of said trunk circuit for connecting said talking circuit to the talking circuit of said calling party, for shifting the control of dialing to said dialing circuit, and for energizing said signal lamp to signal the operator that a call has landed on said trunk circuit, means for answering said calling party back over said talking circuit and over said automatic link, means operable by the operator for dialing said called party back over said trunk circuit and through said automatic link, and means operative over said automatic link and said two-wire composite trunk circuit for energizing said signal lamp to signal the operator when the called party answers.

2. In an automatic telephone exchange system of the all-relay type wherein a calling party may require the services of an operator to complete calls to certain called parties, the combination of an automatic exchange of the all-relay type, a plurality of lines entering said exchange, an automatic link in said exchange adapted to be engaged by a calling party over one line for normally establishing connection with a called party over another line, said automatic link including line finder tens and units relay contacts at one end and connector tens and units relay contacts at the other end, an operator's trunk circuit arranged to be connected to said automatic link at a point between the line finder end and the connector end thereof, means operable by said calling party for dialing the operator over the line finder end of said automatic link and thence over said operator's trunk circuit without going through the connector end of said automatic link, a signal lamp at the operator's position responsive to said trunk circuit for signalling the operator that a call has landed on the associated operator's trunk circuit, means for answering said calling party over said trunk circuit and line finder end of said automatic link, means operable by the operator for dialing said called party back over said trunk circuit through the connector end of said automatic link in said same automatic exchange, connector relay means connected across the connector end of said automatic link whereby said connector relay means will be energized over the called party's line when the called party answers by picking up his receiver, trunk relay means energized by the operation of said connector relay means, means for causing said signal lamp at the operator's position to respond to the operation of said trunk relay means whereby the operator will be signaled over said automatic link and trunk circuit when the called party answers, and means enabling the operator to release the trunk connections while leaving the calling and called parties interconnected through said automatic exchange.

3. In an automatic telephone exchange system of the all-relay type wherein a calling party may require the services of an operator to complete calls to certain called parties, the combination of an automatic exchange of the all-relay type, a plurality of lines entering said exchange, an automatic link in said exchange adapted to be engaged by a calling party over one line for normally establishing connection with a called party over another line, said automatic link including line finder tens and units relay contacts at one end, connector tens and units relay contacts at the other end, and a relay counting chain operative to control the tens and units relay contacts at the connector end, said counting chain being normally responsive to dialing operations of the calling party, an operator's trunk circuit arranged to be connected to said automatic link at a point between the line finder end and the connector end thereof, means operable by said calling party for dialing the operator over the line finder end of said automatic link and thence over said operator's trunk circuit, a signal lamp at the operator's position, means for energizing said signal lamp to signal the operator that a call has landed on the associated operator's trunk circuit means for answering said calling party over said trunk circuit and line finder end of said automatic link, means operable by the operator for dialing the called party back over said trunk circuit and said automatic link and through the control of said counting chain without the necessity of extension through another trunk circuit, and means for energizing said signal lamp to signal the operator over said automatic link and trunk circuit when the called party answers.

4. In an automatic telephone exchange system wherein a calling party may require the services of an operator to complete calls to certain called parties, in combination, an automatic exchange, a plurality of lines entering said exchange, a line finder and a connector together constituting an automatic link in said exchange adapted to be engaged by a calling party over one line for normally establishing connection with a called party over another line, a plurality of operator trunk circuits available to the calling party and adapted to be connected to said automatic link, each of said operator's trunk circuits including a two-wire composite signalling, talking and dialling circuit means for selecting the next idle trunk circuit when the calling party signals the operator and for connecting such trunk circuit to said automatic link, means for answering said calling party over said trunk circuit and said automatic link, means operable by the operator for dialing said called party back over said trunk circuit and said automatic link without the necessity of extension through another trunk circuit, and a signal device at the operator's position for signaling the operator over said automatic link and said two-wire composite trunk circuit when the called party answers.

5. In an automatic telephone exchange system of the all-relay type wherein a calling party may require the services of an operator to complete calls to certain called parties, in combination, an automatic exchange of the all-relay type, a plurality of lines entering said exchange, a line finder and a connector together constituting an automatic link in said exchange adapted to be engaged by a calling party over one line for normally establishing connection with a called party over another line, an operator's position, a composite trunk circuit terminating at said operator's position and arranged to be connected to said automatic link, a signal lamp at the operator's position, means operable by said calling party for energizing said signal lamp over said automatic link and trunk circuit, means for answering said calling party over said trunk circuit and said automatic link, means operable by the operator for dialling said called party back over said trunk circuit and said automatic link without the necessity of extension through another trunk circuit, means operative over said automatic link and composite trunk circuit for causing said signal lamp to light for indicating to the operator when the called party answers, means enabling the operator to supervise the call between said calling and called parties, and means operative over said automatic link and composite trunk circuit for causing said signal lamp to be extinguished for indicating to the operator when either one of said parties hangs up at the conclusion of such supervised call.

ROBERT T. CAMPBELL.

REFERENCES CITED

The following references are of record in the file of this patent:

UNITED STATES PATENTS

| Number | Name | Date |
|---|---|---|
| 2,073,752 | Norton | Mar. 16, 1937 |
| 2,158,945 | Peterson | May 16, 1939 |
| 2,268,397 | Hersey | Dec. 30, 1941 |
| 2,294,237 | McKim | Aug. 25, 1942 |
| 2,317,833 | Voss | Apr. 27, 1943 |
| 2,337,411 | Peterson | Dec. 21, 1943 |